(12) United States Patent
Yan et al.

(10) Patent No.: US 12,477,412 B2
(45) Date of Patent: Nov. 18, 2025

(54) METHOD AND APPARATUS FOR PERFORMING HANDOVER PROCEDURE

(71) Applicant: LENOVO (BEIJING) LIMITED, Beijing (CN)

(72) Inventors: Le Yan, Shanghai (CN); Mingzeng Dai, Beijing (CN); Congchi Zhang, Shangahi (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 326 days.

(21) Appl. No.: 18/260,121

(22) PCT Filed: Dec. 31, 2020

(86) PCT No.: PCT/CN2020/142318
§ 371 (c)(1),
(2) Date: Jun. 30, 2023

(87) PCT Pub. No.: WO2022/141470
PCT Pub. Date: Jul. 7, 2022

(65) Prior Publication Data
US 2024/0073755 A1    Feb. 29, 2024

(51) Int. Cl.
*H04W 36/00* (2009.01)
*H04W 36/18* (2009.01)
*H04W 36/36* (2009.01)

(52) U.S. Cl.
CPC ... *H04W 36/0069* (2018.08); *H04W 36/0061* (2013.01); *H04W 36/00835* (2018.08); *H04W 36/185* (2023.05); *H04W 36/362* (2023.05)

(58) Field of Classification Search
CPC .................................................. H04W 36/00
See application file for complete search history.

(56) References Cited

U.S. PATENT DOCUMENTS

2020/0022055 A1    1/2020  Yan et al.
2021/0136638 A1*   5/2021  Paladugu ............ H04W 36/362
2022/0408323 A1*  12/2022  Ishii .................. H04W 36/0055
(Continued)

FOREIGN PATENT DOCUMENTS

| CN | 110351801 A | 10/2019 |
| CN | 111294766 A | 6/2020 |
| WO | 2018113661 A1 | 6/2018 |

(Continued)

OTHER PUBLICATIONS

CATT, "Report on Email Discussion [107b#52][NR MobE] Open Issues Conditional PSCell Addition/Change (CATT)", 3GPP TSG-RAN WG2 Meeting #108 R2-1915962, Nov. 18-22, 2019, pp. 1-46.

(Continued)

*Primary Examiner* — Michael T Vu
(74) *Attorney, Agent, or Firm* — Kunzler Bean & Adamson

(57) ABSTRACT

The present application relates to a method and an apparatus for performing a handover procedure. One embodiment of the subject application provides a method, which includes: receiving a configuration signaling including first configuration information or second configuration information; determining a first target primary cell (PCell) based on the configuration signaling; and performing a handover procedure to the first target PCell.

20 Claims, 8 Drawing Sheets

(56) References Cited

U.S. PATENT DOCUMENTS

2023/0262541 A1* 8/2023 Ozturk ............. H04W 36/0058
370/331

FOREIGN PATENT DOCUMENTS

| WO | 2019240770 A1 | 12/2019 |
| WO | 2020145778 A1 | 7/2020 |

OTHER PUBLICATIONS

International Searching Authority, "Written Opinion of the International Searching Authority," PCT/CN2020/142318, Oct. 8, 2021, pp. 1-3.

* cited by examiner

METHOD AND APPARATUS FOR PERFORMING HANDOVER PROCEDURE

TECHNICAL FIELD

The subject application relates to wireless communication technologies, especially to a method and an apparatus for performing a handover (HO) procedure.

BACKGROUND OF THE INVENTION

Conditional primary secondary cell (PSCell) addition (CPA) is a mechanism that one or more candidate PSCells can be configured, and the user equipment (UE) can select one PSCell whose CPA execution condition is met as the target PSCell from the one or more candidate PSCells. This mechanism can be used to improve the reliability of secondary node (SN) addition procedure.

The CPA may be combined with the handover procedures, for example, the normal handover (HO), the dual active protocol stack (DAPS) handover, or the conditional handover (CHO), therefore, it is desirable to provide a solution for the UE to handle the CPA configuration together with target cell information or CHO configuration.

SUMMARY

During the handover preparation phase for the normal handover, DAPS handover, or CHO, candidate PSCells may be selected. Therefore, in addition to target cell information or CHO configuration, the UE can be configured with CPA configuration. The present disclosure proposes several solutions for the UE to handle the CPA configuration together with target cell information or CHO configuration as follows:

One embodiment of the subject application provides a method, which includes: receiving a configuration signaling including first configuration information or second configuration information; determining a first target primary cell (PCell) based on the configuration signaling; and performing a handover procedure to the first target PCell; wherein the first configuration information includes information of a first target PCell, information of a set of candidate primary secondary cells (PSCells), and each of the set of candidate PSCells is associated with the first target PCell and is configured with a conditional PSCell addition (CPA) execution condition; and wherein the second configuration information includes information of one or more candidate PCells, each candidate PCell is associated with a conditional handover (CHO) execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition.

In one embodiment of the present disclosure, in the case that the handover procedure to the first target PCell is successful, the method further includes: evaluating the CPA execution condition of each of a set of candidate PSCells associated with the first target PCell.

In one embodiment of the present disclosure, in the case that the handover procedure to the first target PCell is unsuccessful, the method further includes: performing a cell selection procedure based on a predefined criteria to select cell as a second target PCell among a cell group at least including: a set of candidate PSCells associated with the first target PCell, the one or more candidate PCells except the first target PCell, and each corresponding set of candidate PSCells associated with the one or more candidate PCells.

In one embodiment of the present disclosure, in the case that the second target PCell is included in the cell group, performing a random access channel (RACH) procedure to the second target PCell; or in the case that the second target PCell is not included in the cell group, performing a radio resource control (RRC) re-establishment procedure to the second target PCell.

In one embodiment of the present disclosure, the UE evaluates the CPA execution condition of each of a set of candidate PSCells associated with the first target PCell during the handover procedure to the first target PCell.

In one embodiment of the present disclosure, the UE determines a candidate PSCell associated with the first target PCell whose associated CPA execution condition being met as a target PSCell; and performs a RACH procedure to the target PSCell.

In one embodiment of the present disclosure, in the case that the handover procedure to the first target PCell is unsuccessful or a radio link failure occurs in the first target PCell, the method further includes: performing data transmission with the target PSCell or continuing access to the target PSCell without triggering a RRC re-establishment procedure.

In one embodiment of the present disclosure, in the case that none of the CPA execution conditions of each of a set of candidate PSCells associated with the first target PCell is met, the method further includes: continuing to evaluate the CPA execution condition of each of a set of candidate PSCells associated with the first target PCell for a predefined period or until a timer expires.

In one embodiment of the present disclosure, in the case that none of the CPA execution conditions of each of a set of candidate PSCells associated with the first target PCell is met, the method further includes: performing a cell selection procedure based on a predefined criteria to select cell as a second target PCell among a cell group at least including: a set of candidate PSCells associated with the first target PCell, the one or more candidate PCells except the first target PCell, and each corresponding set of candidate PSCells associated with the one or more candidate PCells.

In one embodiment of the present disclosure, the UE performs a random access channel (RACH) procedure to the second target PCell, in the case that the second target PCell is included in the cell group; or the UE performs a radio resource control (RRC) re-establishment procedure to the second target PCell, in the case that the second target PCell is not included in the cell group.

In one embodiment of the present disclosure, in the case that the configuration signaling includes the second configuration information, the method further includes: determining a candidate PCell whose associated CHO execution condition being met as the first target PCell; determining a candidate PSCell in a set of candidate PSCells associated with the first target PCell whose associated CPA execution condition being met as the target PSCell; and performing the handover procedure to the first target PCell and performing a RACH procedure to the target PSCell simultaneously.

In one embodiment of the present disclosure, in the case that the handover procedure to the first target PCell is unsuccessful or a radio link failure occurs in the first target PCell, and the RACH procedure to the target PSCell is successful, the method further includes: performing data transmission with the target PSCell without triggering a RRC re-establishment procedure.

In one embodiment of the present disclosure, in the case that the handover procedure to the first target PCell is unsuccessful and the RACH procedure to the target PSCell is ongoing, the method further includes: continuing to access to the target PSCell, or performing a cell selection procedure based on a predefined criteria to select a cell as a second target PCell among a cell group at least including: a set of candidate PSCells associated with the first target PCell, the one or more candidate PCells except the first target PCell, and each corresponding set of candidate PSCells associated with the one or more candidate PCells.

In one embodiment of the present disclosure, in the case that the access to the target PSCell is unsuccessful, the method further includes: performing a cell selection procedure based on a predefined criteria to select a cell as a second target PCell among a cell group at least including: a set of candidate PSCells associated with the first target PCell, the one or more candidate PCells except the first target PCell, and each corresponding set of candidate PSCells associated with the one or more candidate PCells.

Yet another embodiment of the subject application provides an apparatus, comprising: a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement the method, which includes: receiving a configuration signaling including first configuration information or second configuration information; determining a first target primary cell (PCell) based on the configuration signaling; and performing a handover procedure to the first target PCell; wherein the first configuration information includes information of a first target PCell, information of a set of candidate primary secondary cells (PSCells), and each of the set of candidate PSCells is associated with the first target PCell and is configured with a conditional PSCell addition (CPA) execution condition; and wherein the second configuration information includes information of one or more candidate PCells, each candidate PCell is associated with a conditional handover (CHO) execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition.

DETAILED DESCRIPTION

The detailed description of the appended drawings is intended as a description of the currently preferred embodiments of the present invention, and is not intended to represent the only form in which the present invention may be practiced. It should be understood that the same or equivalent functions may be accomplished by different embodiments that are intended to be encompassed within the spirit and scope of the present invention.

Figure 1:
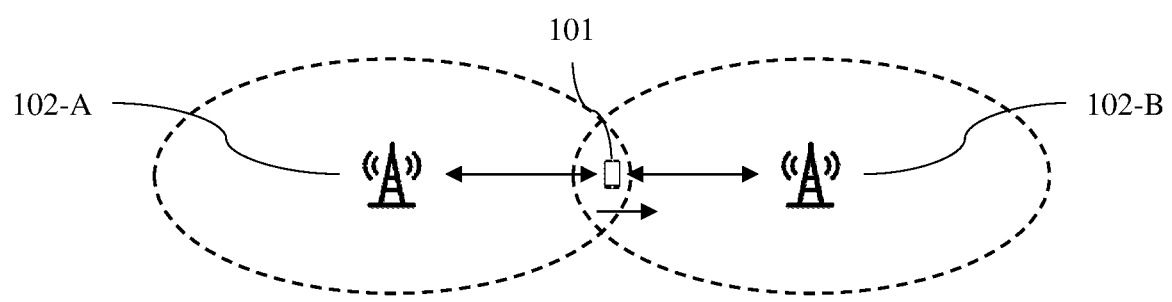
FIG. 1 illustrates a schematic diagram of a wireless communication system in accordance with some embodiments of the present disclosure.

FIG. 1 depicts a wireless communication system according to an embodiment of the present disclosure.

As shown in FIG. 1, the wireless communication system includes UE 101, base station (BS) 101-A, and base station 102-B. Even though a specific number of UE and BSs are depicted in FIG. 1, person skilled in the art will recognize that any number of UEs and BSs may be included in the wireless communication system.

The UE 101 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present disclosure, the UE 101 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 101 includes wearable devices, such as smart watches, fitness bands, optical head-mounted displays, or the like. Moreover, the UE 101 may be referred to as subscriber units, mobiles, mobile stations, users, terminals, mobile terminals, wireless terminals, fixed terminals, subscriber stations, UE 101, user terminals, a device, or by other terminology used in the art. The UE 101 may communicate directly with a BS via uplink (UL) communication signals.

The BSs may be distributed over a geographic region. In certain embodiments, a BS may also be referred to as an access point, an access terminal, a base, a base station, a macro cell, a Node-B, an enhanced Node B (eNB), a BS, a Home Node-B, a relay node, a device, or by any other terminology used in the art. The BSs are generally part of a radio access network that may include one or more controllers communicably coupled to one or more corresponding BSs.

The wireless communication system is compliant with any type of network that is capable of sending and receiving wireless communication signals. For example, the wireless communication system is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a LTE network, a 3rd Generation Partnership Project (3GPP)-based network, 3GPP 5G network, a satellite communications network, a high altitude platform network, and/or other communications networks.

In one implementation, the wireless communication system is compliant with the NR of the 3GPP protocol, wherein the BS transmits using an orthogonal frequency division multiplexing (OFDM) modulation scheme on the DL and the UE 101 transmits on the uplink using a single-carrier frequency division multiple access (SC-FDMA) scheme or OFDM scheme. More generally, however, the wireless communication system may implement some other open or proprietary communication protocol, for example, WiMAX, among other protocols.

In other embodiments, the BS may communicate using other communication protocols, such as the IEEE 802.11 family of wireless communication protocols. Further, in some embodiments the BS may communicate over licensed spectrum, while in other embodiments the BS may communicate over unlicensed spectrum. The present disclosure is not intended to be limited to the implementation of any particular wireless communication system architecture or protocol. In another embodiment, the BS may communicate with UE 101 using the 3GPP 5G protocols.

As shown in FIG. 1, the UE 101 is currently served by BS 102-A, and is moving towards BS 102-B. In this scenario, the UE may need to perform handover from BS 102-A to BS 102-B. The BS 102-A is considered as the source node, the source BS, the source gNB, the source eNB, or the like. The BS 102-B is considered as the target node, the target BS, the target gNB, the target eNB, etc.

Figure 2:
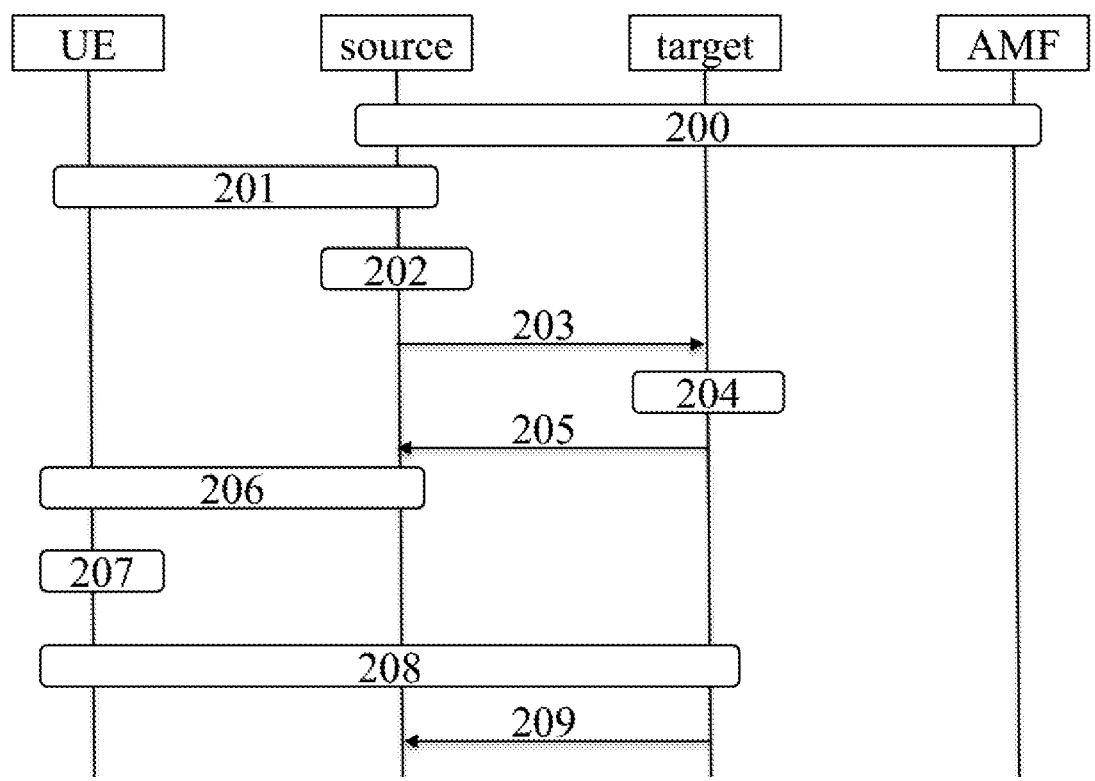
FIG. 2 illustrates a flow chart of a handover procedure in accordance with some embodiments of the present disclosure.

FIG. 2 depicts a normal handover procedure according to some embodiments of the present disclosure. FIG. 2 illustrates the UE, the source gNB (which is denoted as "source", e.g., the BS 102-A in FIG. 1), the target gNB (which is denoted as "target", e.g., the BS 102-B in FIG. 1), and the access and mobility management function (AMF).

In step 200, the mobility control information is provided by the AMF, i.e., the UE context within the source gNB contains information regarding roaming and access restrictions which are provided either at connection establishment or at the last tracking area (TA) update.

In step 201, the source gNB configures the UE measurement procedures and the UE reports according to the measurement configuration.

In step 202, the source gNB decides to hand over the UE, based on measurement report from the UE and radio resource management (RRM) information.

In step 203, the source gNB transmits a handover request message to the target gNB, and the source gNB also transmits a transparent RRC container with necessary information to prepare the handover at the target side.

In step 204, the target gNB performs admission control. Slice-aware admission control can be performed if the slice information is sent to the target gNB. If the protocol data unit (PDU) sessions are associated with non-supported slices, the target gNB may reject such PDU sessions.

In step 205, the target gNB prepares the handover, and sends the handover request acknowledge to the source gNB, which includes a transparent container to be sent to the UE as an RRC message to perform the handover. The target gNB also indicates whether a DAPS handover is accepted.

In step 206, the source gNB triggers the Uu handover by sending an RRCReconfiguration message to the UE, containing the information required to access the target cell.

In step 207, the UE detaches from the source cell, and is synchronized with the target cell.

In step 208, the UE is synchronized with the target cell and completes the RRC handover procedure by sending message named as "RRCReconfigurationComplete" to target gNB. In the case that the handover procedure is a DAPS HO, the UE does not detach from the source cell upon receiving the "RRCReconfiguration" message. The UE releases the source signaling radio bearer (SRB) resources, security configuration of the source cell and stops downlink or uplink reception or transmission with the source gNB upon receiving an explicit release from the target gNB.

In step 209, in case of DAPS handover, the target gNB sends the HANDOVER SUCCESS message to the source gNB to inform that the UE has successfully accessed the target cell.

Figure 3:
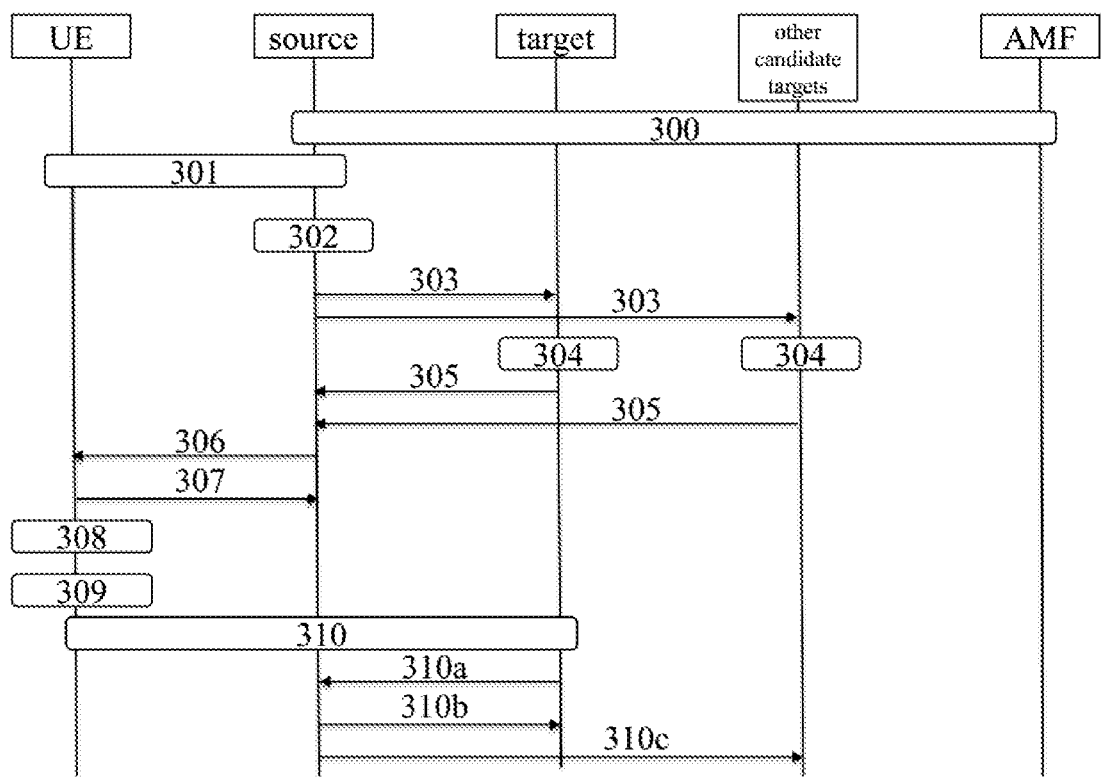
FIG. 3 illustrates a flow chart of a conditional handover procedure in accordance with some embodiments of the present disclosure.

FIG. 3 illustrates a flow chart of a conditional handover procedure in accordance with some embodiments of the present disclosure. FIG. 3 illustrates the UE, the source gNB (which is denoted as "source"), the candidate target gNB (which is denoted as "target"), the other potential candidate targets gNB (which is denoted as "other potential targets"), and the access and mobility management function (AMF).

A CHO is defined as a handover that is executed by the UE when one or more handover execution conditions are met. The UE starts evaluating the one or more execution conditions upon receiving the CHO configuration, and stops evaluating the one or more handover execution conditions once a handover is executed, for example, the normal handover execution or the conditional handover execution.

In some embodiment, the CHO may have the following principles:

1. The CHO configuration contains the configuration of CHO candidate cell(s) generated by the candidate gNB(s) and execution condition(s) generated by the source gNB.
2. An execution condition may consist of one or two trigger condition(s). Only single reference signal type is supported and at most two different trigger quantities can be configured simultaneously for the evaluation of CHO execution condition of a single candidate cell. The two different trigger quantities may be reference signal receiving power (RSRP) and reference signal receiving quality (RSRQ), RSRP and signal to interference plus noise ratio (SINR), etc.
3. Before any CHO execution condition is satisfied, upon reception of HO command (without CHO configuration), the UE executes the HO procedure, regardless of any previously received CHO configuration.
4. While executing CHO, i.e., from the time when the UE starts synchronization with target cell, UE does not monitor source cell.

As in intra-NR RAN handover, in intra-NR RAN CHO, the preparation and execution phase of the conditional handover procedure is performed without involvement of the 5G core network; i.e., preparation messages are directly exchanged between gNB s. The release of the resources at the source gNB during the conditional handover completion phase is triggered by the target gNB.

In step 300, the mobility control information is provided by the AMF, i.e., the UE context within the source gNB contains information regarding roaming and access restrictions which were provided either at connection establishment or at the last TA update.

In step 301, the source gNB configures the UE measurement procedures and the UE reports according to the measurement configuration.

In step 302, the source gNB decides to use CHO. In step 303, the source gNB requests CHO to one or more candidate target gNBs, which includes the target candidate gNB, and other potential candidate gNB, by transmitting a CHO request message to each gNB of the one or more candidate target gNBs.

In step 304, each candidate gNB performs admission control. In step 305, each candidate gNB transmits a response to the CHO request, i.e. HO REQUEST ACKNOWLEDGE, to the source gNB. The response includes configuration of CHO candidate cell(s).

In step 306, the source gNB sends an RRCReconfiguration message to the UE, containing the configuration of CHO candidate cell(s) and CHO execution condition(s). In step 307, the UE sends an RRCReconfigurationComplete message to the source gNB.

In step 308, the UE maintains connection with the source gNB after receiving CHO configuration, and starts evaluating the CHO execution conditions for the candidate cell(s). Supposing the target candidate gNB has the CHO condition being met, in step 309, the UE detaches from the source gNB, applies the stored corresponding configuration for that selected target candidate cell, and is synchronized with that target gNB. In step 310, the UE completes the RRC handover procedure by sending RRCReconfigurationComplete message to the target gNB. The UE releases stored CHO configurations after successful completion of RRC handover procedure.

In step 310a, the target gNB sends the HANDOVER SUCCESS message to the source gNB to inform that the UE has successfully accessed the target cell.

In step 310b, the source gNB sends the SN STATUS TRANSFER message. Late data forwarding may be initiated as soon as the source gNB receives the HANDOVER SUCCESS message.

In step 310c, the source gNB sends the HANDOVER CANCEL message toward the other signaling connections or other potential target gNBs, if any, to cancel CHO for the UE.

Figure 4:
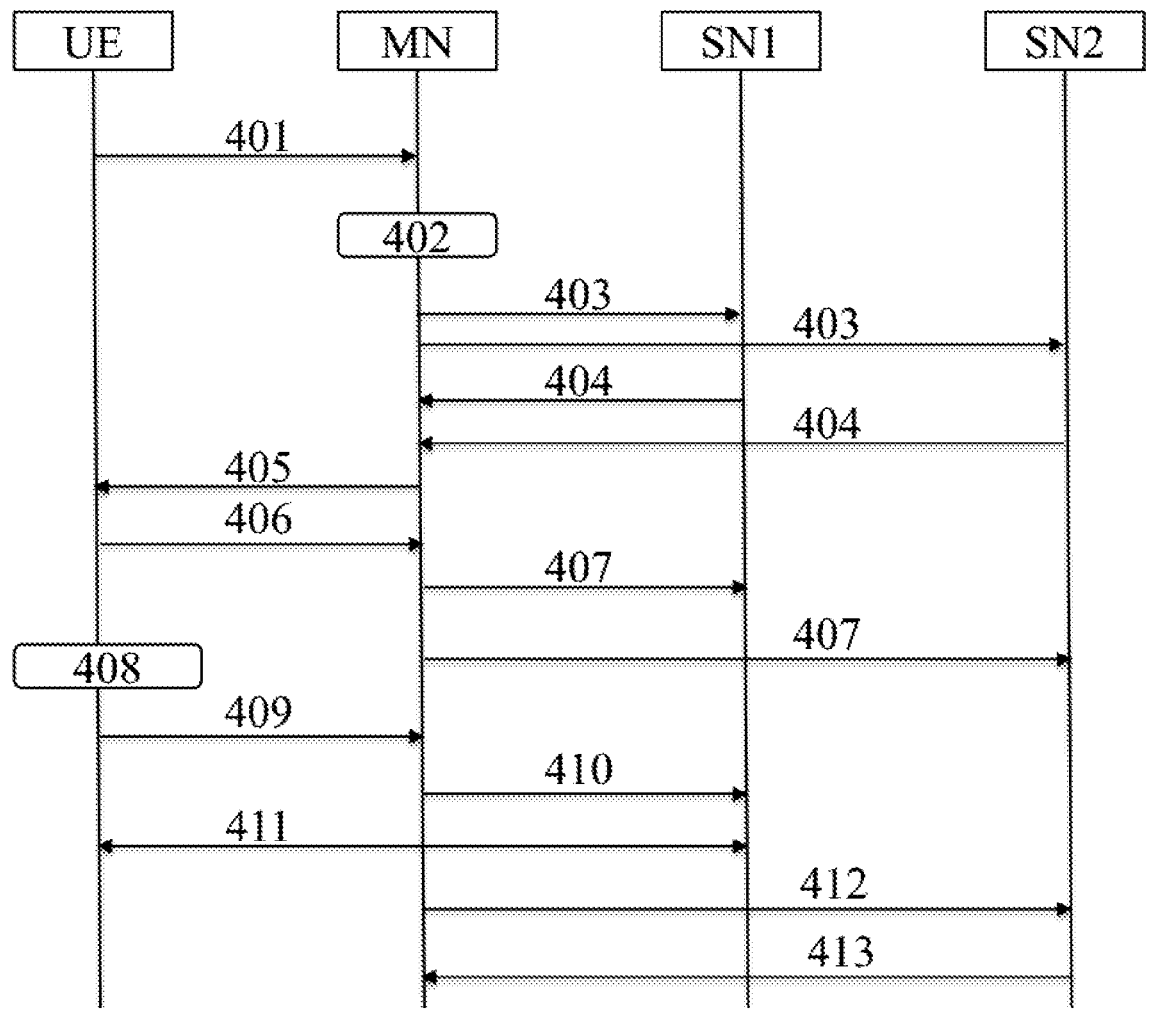
FIG. 4 illustrates a flow chart of a conditional PSCell addition procedure in accordance with some embodiments of the present disclosure.

FIG. 4 illustrates a flow chart of a conditional PSCell addition procedure in accordance with some embodiments of the present disclosure. FIG. 4 illustrates the UE, the master node (MN), the secondary node 1 (SN1), and the secondary node 2 (SN2).

In step 401, the UE transmits the RRC measurement report to the MN. In step 402, the MN decides to use CPA based on the RRC measurement report received from UE.

In step 403, the MN request CPA to each candidate SNs, i.e., SN1 and SN2. A CPA request is sent to each candidate SN. A CPA indicator can be included in the SN Addition Request message for CPA preparation, the MN can also provide the latest measurement results for each candidate SN to choose and configure the SCG cell(s) in the SN Addition Request message.

In step 404, each candidate SN transmits the SN addition request acknowledge message to the MN. The candidate SN may decide one or more candidate PSCell(s) and other related candidate secondary cell group (SCG) SCells. The candidate SN can provide the new SCG radio resource configuration to the MN within an SN RRC configuration message contained in the SN Addition Request Acknowledge message.

In step 405, the MN sends the RRC reconfiguration message to the UE including the SN RRC configuration message(s) received in step 404 without any modification, and the RRC reconfiguration message also includes the CPA execution condition(s) for each candidate PSCell generated by the MN. The CPA execution condition(s) can be used to evaluate whether the corresponding candidate PSCell can be selected as the target PSCell, i.e., if the CPA execution condition of one candidate PSCell is met, then this candidate PSCell can be added as target PSCell by the UE. The CPA execution condition may be the measured quality of a specific candidate PSCell being above a corresponding predefined threshold.

In step 406, the UE checks that whether the CPA configuration (including SCG radio resource configuration and CPA execution condition(s)) included in the RRC reconfiguration message are available, and if available, the UE transmits an RRCReconfigurationComplete message to the MN.

In step 407, the MN informs the candidate SN(s) that the RRC reconfiguration message is available, via SN reconfiguration complete message.

In step 408, the UE maintains connection with the MN after receiving CPA configuration sent from the MN, and starts evaluating whether the CPA execution conditions are met for candidate target PSCell(s).

In step 409, upon at least one CPA execution condition is met, the UE transmits one RRC message e.g., ULInformationTransferMRDC message to the MN including an embedded RRCReconfigurationComplete message to the target SN. The selected target PSCell information (e.g. a physical cell ID (PCI) or cell global ID (CGI) of the target PSCell) or the selected target SN information (e.g. ID of the target SN) can be included in the ULInformationTransferMRDC message.

In step 410, the MN informs the selected target SN that the UE has completed the reconfiguration procedure successfully via SN Reconfiguration Complete message, including the SN RRC response message, i.e. RRCReconfigurationComplete received from the UE.

In step 411, the UE performs synchronization towards the selected target PSCell configured by the selected target SN.

In step 412, the MN transmits a SN release request to other candidate target SN, i.e. SN2, to cancel CPA configuration. In step 413, SN2 transmits the SN release acknowledge to the MN.

In the procedures in FIGS. 2-4, the UE does not handle the CPA configuration together with target cell information or CHO configuration. The present disclosure proposes solutions for the UE to handle the CPA configuration together with target cell information or CHO configuration.

Figure 5A:
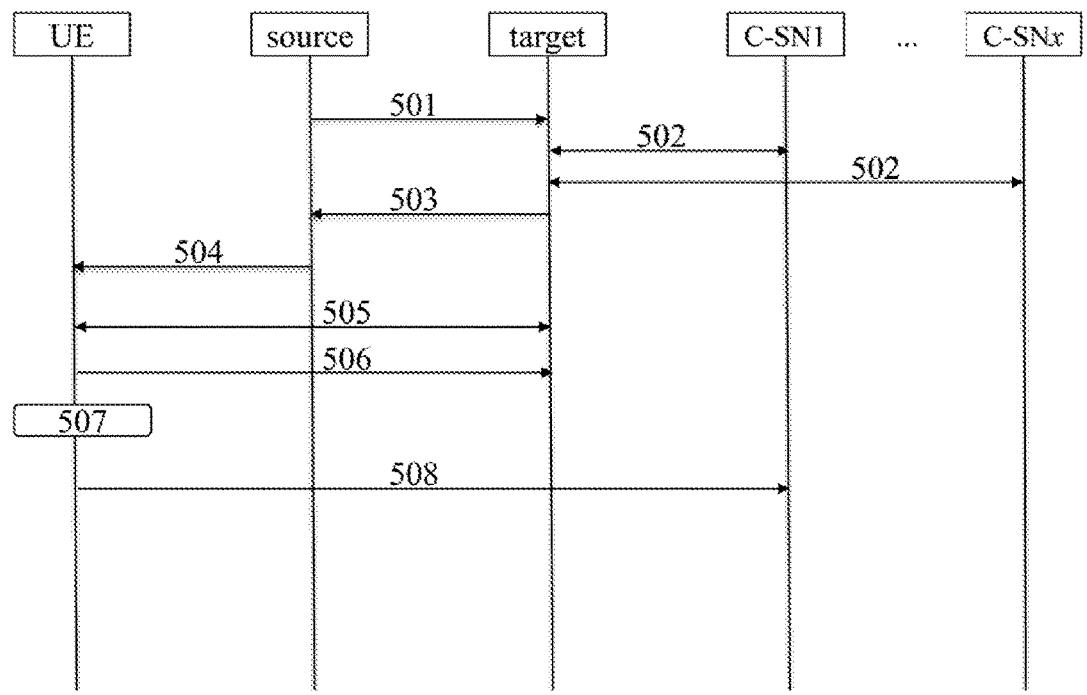
FIG. 5a illustrates a flow chart of handling the CPA configuration in a handover procedure in accordance with some embodiments of the present disclosure.
Figure 5B:
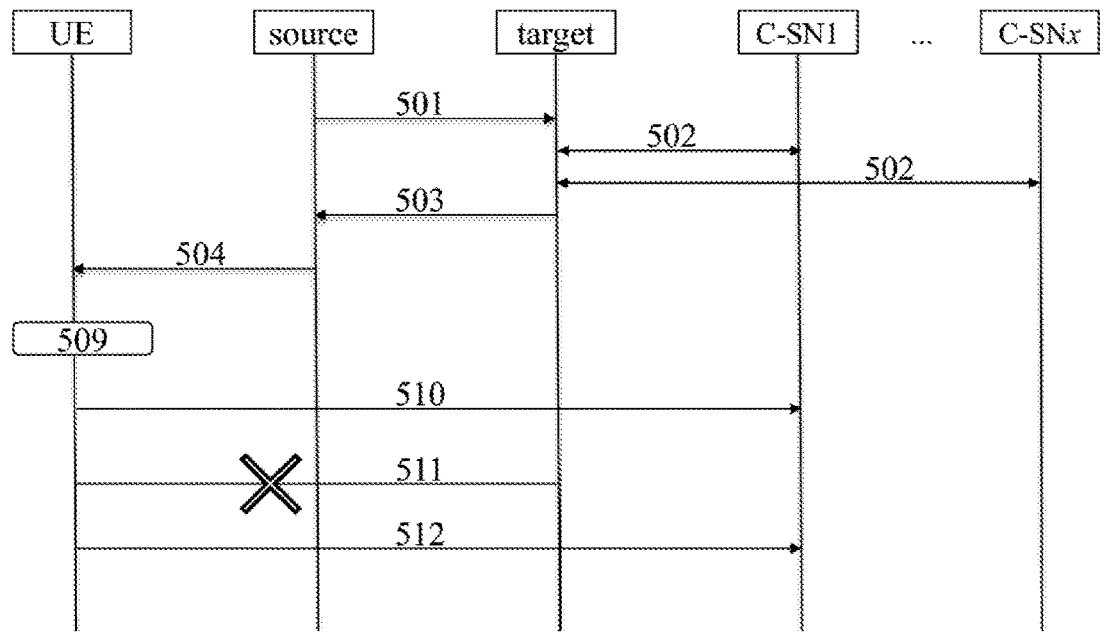
FIG. 5b illustrates another flow chart of handling the CPA configuration in a handover procedure in accordance with some embodiments of the present disclosure.

FIGS. 5a and 5b illustrate flow charts of handling the CPA configuration in a handover procedure in accordance with some embodiments of the present disclosure.

In FIGS. 5a and 5b, "UE" refers to the user equipment, "source" refers to a source node, or a source master node, and "target" refers to a target node, or a target master node. The target node manages a target PCell, and may also manage a number of secondary cells. The target node may be related with one or more candidate SNs. In FIGS. 5a and 5b, "C-SN1" refers to the first candidate secondary node of the target node, or the first candidate secondary node related with the target node, and "C-SNx" refers to the $x^{th}$ candidate secondary node of the target node, or the $x^{th}$ candidate secondary node related with the target node, where x represents the total number of the candidate SNs, and x is an integer equal to or larger than one.

Based on the measurement report received from UE, the source master node decides to hand over the UE, and in step 501, the source master node transmits a HO request to the target node. In step 502, the target node transmits SN addition request message including, i.e., the CPA indication, to each candidate SN, e.g. C-SN1, . . . , C-SNx. In return, each candidate SN, transmits an ACK to the SN addition request, which may be a SN Addition Request Acknowledge message, including the configuration of candidate PSCell(s), to the target node.

In step 503, the target node transmits an acknowledgement to the HO request, which includes the CPA configuration. In step 504, the source node transmits the RRC configuration message, which includes the CPA configuration to the UE.

Specifically, the RRC configuration message may include at least the following information: i) the target PCell information, which may be represented by an information element (IE), for example the IE ReconfigurationWithSync, and ii) the CPA configuration. The CPA configuration includes the CPA execution condition and the candidate PSCell(s) information, i.e. the secondary cell group information which can be represented by the IE CellGroupConfig.

The target PCell information and the CPA execution condition are generated by the target node, and the candidate PSCell(s) information is generated by the corresponding candidate secondary nodes.

Upon receiving the RRC reconfiguration message from the source node, in step 505, the UE performs the handover procedure, e.g. a RACH procedure, towards the target PCell.

If the handover procedure is successful, the UE may send the RRC reconfiguration complete message to the target node indicating that the handover procedure is successful. In step 506, the UE transmits a RRC reconfiguration complete message to the target node.

In step 507, after the handover procedure is successful, the UE starts to evaluate the CPA condition. If the CPA execution condition of one candidate PSCell is met, the UE can select this candidate PSCell with the CPA execution condition being met to be added as PSCell, e.g. the UE may perform a RACH procedure towards this PSCell. For example, the CPA execution condition of one candidate PSCell managed by C-SN1 is satisfied, in step 508, the UE performs a RACH procedure to the candidate PSCell belonging to C-SN1.

After handover procedure is successful, if none of the CPA execution condition of the candidate PSCells can be fulfilled (which means there is no target PSCell), the UE may release or remove the received or stored CPA configuration when radio ink failure (RLF) occurs in the target PCell.

In step 505, the UE performs the handover procedure, e.g. a RACH procedure, towards the target PCell. After the handover procedure is successful, the UE may be served by the target PCell.

If the handover procedure fails, at least one of the following options may be carried out:

Option 1: the UE may release or remove the received or stored CPA configuration, and perform a RRC re-establishment procedure.

Option 2: the UE may perform a cell selection procedure based on a certain criteria. For example, the criteria may be a commonly used criteria, for example, the S-criteria; or any criteria that could be used to decide whether the cell is suitable for the UE to access to, for instance, the cell quality is higher than one threshold. The threshold can be configured by the network, e.g. the threshold is included in the RRC reconfiguration message sent in step 504, or the threshold is fixed in the 3GPP specification. If the selected cell belongs to the candidate PSCells (e.g. the selected cell is managed by one of C-SN1, . . . , C-SNx as shown in FIG. 5a or FIG. 5b), then the UE performs a RACH procedure towards the selected cell; if RACH is successful, the UE can keep data transmission with the selected cell, and consider this selected cell as the new PCell. If the RACH procedure towards the selected cell fails, the UE may initiate a RRC re-establishment procedure. If the selected cell does not belong to the candidate PSCells, the UE performs RRC re-establishment procedure.

Option 3: the UE may perform a cell selection procedure based on a certain criteria among the candidate PSCells. For example, as shown in FIG. 5a, the UE performs the cell selection procedure among the candidate PSCells belonging to C-SN1, . . . , C-SNx. If none of the candidate PSCells belonging to C-SN1, . . . , C-SNx fulfils the criteria, the UE may start the RRC re-establishment procedure.

FIG. 5b illustrates another flow chart of handling the CPA configuration in a handover procedure in accordance with some embodiments of the present disclosure.

In FIG. 5b, steps 501-504 are similar to the steps in FIG. 5a, and the details are omitted here.

Upon receiving the RRC reconfiguration message from the source node, in step 509, the UE performs a handover procedure towards the target PCell, and meanwhile the UE starts to evaluate the candidate PSCells according to the CPA execution condition.

Once a CPA execution condition of a specific candidate PSCell is satisfied, the UE can perform a PSCell addition procedure to add the specific candidate PSCell as the target PSCell for the UE. The PSCell addition procedure includes synchronization with the target PSCell.

In some embodiments, the result of step 509 may include at least the following cases:

Case 1: the CPA execution condition of one candidate PSCell is met, and the HO procedure successes;

Case 2: the CPA execution condition of one candidate PSCell is met, and after the UE access to the target PSCell successfully, the HO procedure fails, or a RLF occurs in the target PCell;

Case 3: none of the CPA execution conditions of the candidate PSCells is fulfilled, and the HO procedure successes; and Case 4: none of the CPA execution conditions of the candidate PSCells is fulfilled, and after the UE access to the target PSCell successfully, the HO procedure fails, or a RLF occurs in the target PCell.

Case 1: the CPA execution condition of one candidate PSCell is met, and the HO procedure successes. Under this scenario, at step 510, the UE performs synchronization and triggers the RACH procedure to the target PSCell in order to perform a PSCell addition procedure. The RACH procedure, to the target PSCell is also successful, and the UE is served by the target PCell and the target PSCell.

Case 2: the CPA execution condition of one candidate PSCell is met, and the HO procedure fails. In this case, at step 510, the UE performs synchronization and triggers the RACH procedure to the target PSCell in order to perform a PSCell addition procedure. In step 511, after the UE access to the target PSCell successfully, the HO procedure (i.e. the RACH procedure) to the target PCell fails, or a RLF occurs in the target PCell, then in step 512, the UE may consider the target PSCell as new PCell, i.e. C-SN1 is considered as new MN, and continue the data transmission with C-SN1 without triggering the RRC re-establishment procedure. The UE may report a RLF report, including the parameters such as: the source PCell ID, the target PCell ID, the failure cause, which may be handover failure or RLF, or other cause, time elapsed since receiving RRC reconfiguration message to failure, time elapsed since failure, or the like, to the C-SN1.

Case 3: none of the CPA execution condition of one candidate PSCell is fulfilled, and the HO procedure successes. Under this condition, the UE may release or remove the received or the stored CPA configuration when RLF occurs in the target PCell.

Case 4: none of the CPA execution conditions of the candidate PSCells is fulfilled, and after the UE access to the target PSCell successfully, the HO procedure fails or a RLF occurs in the target PCell. In this scenario, in addition to the above Option 1, Option 2, and Option 3, the UE also perform:

Option 4: the UE may continue to evaluate CPA execution condition for a predefined period, such as 10 ms, 100 ms, etc. The predefined period may be defined in the specification, or by the source node, or the UE. Or, the UE may continue to evaluate CPA execution condition until a timer expires, a period of the timer may be configured to the UE via the RRC reconfiguration message sent in step 504. During this period or while the timer is running, if the UE find a predefined condition of a specific candidate PSCell is satisfied, and the UE has successfully accessed to this specific PSCell, the UE may consider this specific PSCell as the new PCell, and keep data transmission with the new PCell. If UE still does not find the specific candidate PSCell, or the accessing to this specific candidate PSCell fails, the UE may perform at least one of the above Option 1, Option 2, or Option 3.

There is a special scenario, that is, the UE finds that a predefined condition of a specific candidate PSCell is satisfied, and the UE is accessing to this specific PSCell. During the accessing period, HOF happens or RLF in the target PCell occurs, the UE may perform at least one of the above options, i.e. Option 1, Option 2, and Option 3. The UE may also perform:

Option 5: the UE may continue to access to this specific PSCell for a predefined period, such as 10 ms, 100 ms, etc. The predefined period may be defined in the specification, or by the source node, or the UE. Or, the UE may continue to access to this specific PSCell until a timer expires, a period of the timer may be configured to the UE via the RRC reconfiguration message sent in step 504. If the accessing to this specific PSCell is successful, the UE may consider this specific PSCell as the new target PCell, and keep data transmission with the new target PCell. If the accessing to this specific candidate PSCell fails, the UE may perform at least one of the above Option 1, Option 2, or Option 3.

Figure 6A:
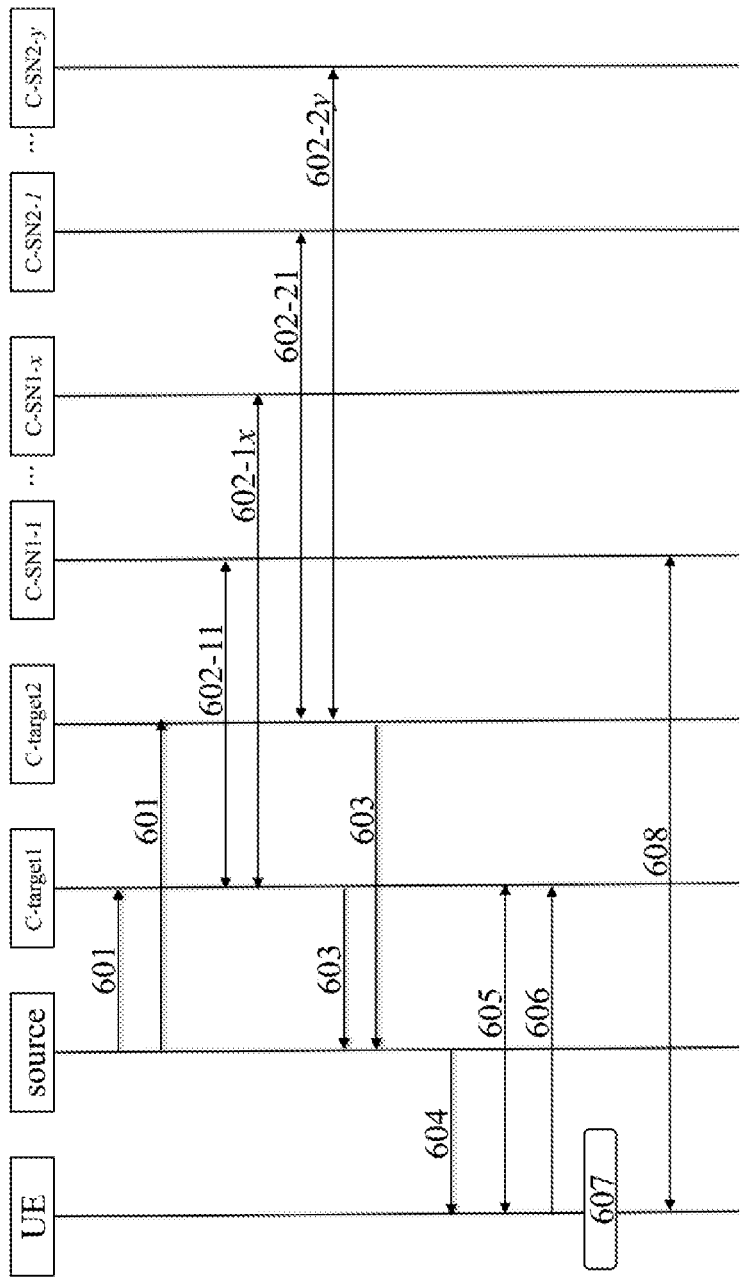
FIG. 6a illustrates a flow chart of handling the CPA configuration in a conditional handover procedure in accordance with some embodiments of the present disclosure.
Figure 6B:
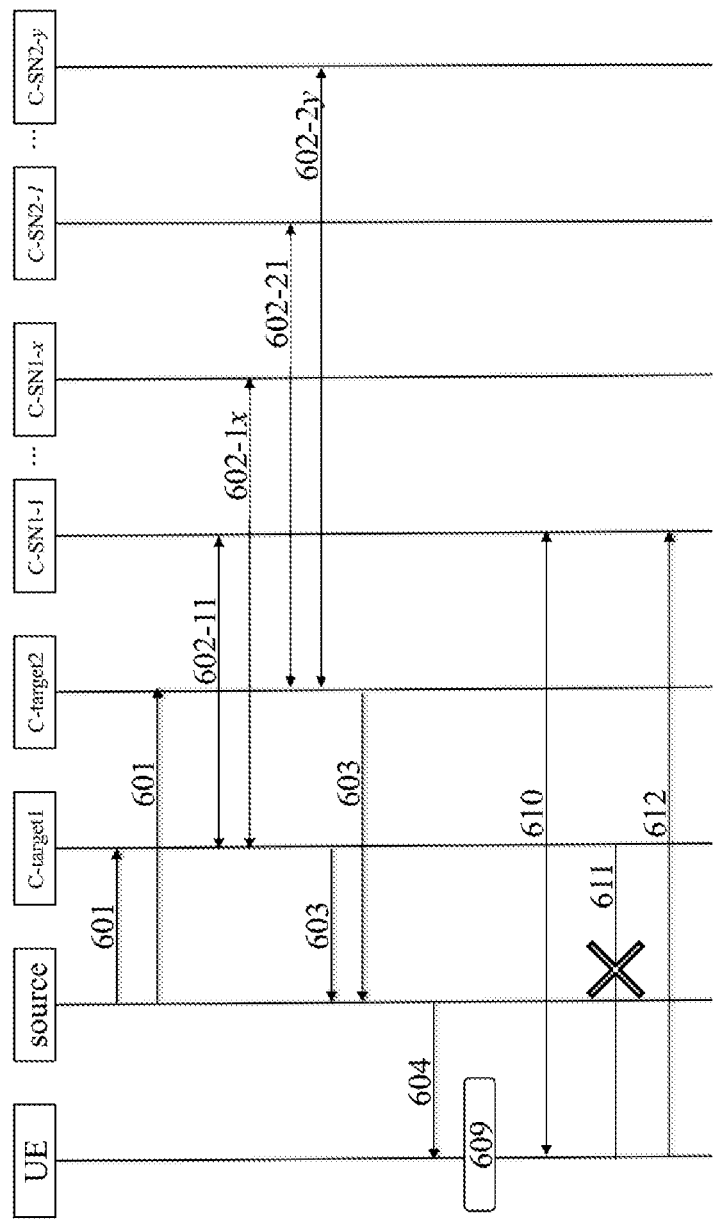
FIG. 6b illustrates another flow chart of handling the CPA configuration in a conditional handover procedure in accordance with some embodiments of the present disclosure.

FIGS. 6a and 6b illustrate flow charts of handling the CPA configuration in a conditional handover procedure in accordance with some embodiments of the present disclosure.

In FIGS. 6a and 6b, "UE" refers to the user equipment, "source" refers to a source node, or a source master node, "C-target1" refers to the first candidate master node; the first candidate master node (i.e. "C-target1") can relate with a number of candidate SNs, which are represented as "C-SN1-1" to "C-SN1-x", where x represents the total number of the candidate SNs related with "C-target1", and x is an integer equal to or larger than one. "C-target2" refers to the second candidate master node, the second candidate master node (i.e. "C-target2") also relates with a number of candidate SNs, which are represented as "C-SN2-1" to "C-SN2-y", where y represents the total number of the candidate SNs related with "C-target2", and y is an integer equal to or larger than one. It should be noted that although there are only two candidate master nodes are presented in FIGS. 6a and 6b, persons skilled in the art understand that other numbers of candidate MNs may also be applied, for example, a communication system may include three candidate MNs wherein one candidate MN is related with three candidate SNs, one candidate MN is related with one candidate SN, and one candidate MN is related with no candidate SN.

Based on the measurement report received from UE, the source master node decides to hand over the UE, and in step 601, the source master node transmits a HO request to each of the candidate PCells, i.e., the source master node transmits separate HO request messages to the candidate MNs (i.e. C-target1 and C-target2 in FIG. 6a) which manage the candidate PCells. If C-target1 is associated with more than one PCells, then the HO request is sent to each PCell associated with the candidate master node C-target1. In other words, the source master node may transmit multiple HO request messages to C-target1, wherein each HO request message is for one candidate PCell associated with C-target1.

Then, each candidate MN transmits the SN addition request message including, i.e., the CPA indication, to the corresponding candidate SN, namely, C-target1 transmits the SN addition request to C-SN1-1 (in step 602-11), . . . , C-SN1-x (in step 602-1x), and C-target2 transmits the SN addition request to C-SN2-1 (in step 602-21), . . . , C-SN2-y (in step 602-2y). If there is more than one candidate PSCells belonging to C-SN1-1, then the SN addition request message is sent for each candidate PSCell belonging to C-SN1-1. The C-target1 may transmit one SN addition request message to C-target1 for all candidate PSCells associated with C-SN1-1. Or, the C-target1 may transmit multiple SN addition request messages, wherein each SN addition request message is for one candidate PSCell associated with C-SN1-1.

In return, each candidate SN, transmits an ACK to the SN addition request, which may be a SN Addition Request Acknowledge message, which includes the configuration of the candidate PSCell to the corresponding candidate MN.

In step 603, each candidate SN transmits an acknowledgement to the HO request, which includes: i) the CHO configuration, and ii) the CPA configuration.

In step 604, the source node transmits the RRC configuration message to the UE, the RRC configuration message includes: i) the CHO configuration, and ii) the CPA configuration.

The CHO configuration includes CHO execution condition and candidate PCell information for each candidate PCell, it may be represented by an IE, for example the IE ReconfigurationWithSync.

CHO execution condition is generated by the source node, the candidate PCell information and CPA execution condition are generated by the candidate MN, and candidate PSCells information is generated by the corresponding candidate SN.

The CPA configuration can include CPA execution condition and candidate PSCell information (i.e., secondary cell group information which can be represented by the IE CellGroupConfig) for one or more candidate PSCell(s).

The candidate PCell information and CPA execution condition are generated by the target MN, and candidate PSCell information is generated by the corresponding candidate SN.

The source MN generates the CHO execution condition for each candidate PCell, the candidate MN generate the candidate PCell information and CPA execution condition for the candidates PSCells, and the candidate SN generates the candidate PSCell information.

For example, in FIGS. 6a and 6b, the UE may receive a RRC reconfiguration message, the RRC reconfiguration message may include two RRC reconfiguration information, each including the information regarding the two candidate PCells. Specifically, the RRC reconfiguration message includes the following information:

1 RRC reconfiguration information 1, which includes information regarding C-target1, wherein a candidate PCell 1 is a primary cell belonging to C-target1:
  1.1 CHO execution condition for candidate PCell 1,
  1.2 candidate PCell 1 information, and
  1.3 the CPA execution condition for candidate PSCell 1-1 that belongs to C-SN1-1, the CPA execution condition for candidate PSCell 1-2 that belongs to C-SN1-2, . . . , the CPA execution condition for candidate PSCell 1-x that belongs to C-SN1-x, candidate PSCell 1-1 information, candidate PSCell 1-2 information, . . . , and candidate PSCell 1-x information;
2 RRC reconfiguration information 2, which includes information regarding C-target2, wherein a candidate PCell 2 is a primary cell belonging to C-target2:
  2.1 CHO execution condition for candidate PCell 2,
  2.2 candidate PCell 2 information, and
  2.3 the CPA execution condition for candidate PSCell 2-1 that belongs to C-SN2-1, the CPA execution condition for candidate PSCell 2-2 that belongs to C-SN2-2, . . . , the CPA execution condition for candidate PSCell 2-y that belongs to C-SN2-y candidate PSCell 2-1 information, candidate PSCell 2-2 information, . . . , and candidate PSCell 2-y information.

The RRC reconfiguration information 1 and RRC reconfiguration information 2 may be included in one RRC message, or they may be included in two separate RRC messages.

Upon receiving the RRC reconfiguration message from the source node, the UE starts to evaluate the CHO execution condition for each candidate PCell, suppose that the CHO execution condition for PCell 1 is met, and in step 605 in FIG. 6a, the UE performs the handover procedure, e.g. a RACH procedure, towards the PCell 1.

If the handover procedure is successful, the UE may send the RRC reconfiguration complete message to the target node, indicating that the handover procedure is successful. In step 606, the UE transmits a RRC reconfiguration complete message to the target node.

In step 607, after the handover procedure towards to PCell 1 is successful, the UE starts to evaluate the CPA condition for each candidate PSCell of PCell 1. If the CPA execution condition of one candidate PSCell is met, the UE can select this candidate PSCell to be added as PSCell, e.g. the UE may perform a RACH procedure towards the selected PSCell. For example, the CPA execution condition of one candidate PSCell managed by C-SN1-1 is satisfied, in step 608, the UE performs a RACH procedure to the candidate PSCell managed by C-SN1-1.

After the handover procedure is successful, if none of the CPA execution condition of the candidate PSCells can be fulfilled, which means there is no target PSCell, the UE may release or remove the received or stored CPA configuration when RLF occurs in the PCell 1.

In step 605, the UE performs the handover procedure, e.g. a RACH procedure, towards the target PCell (i.e. PCell 1). After the handover procedure is successful, the UE may be served by the target PCell.

If the handover procedure fails, at least one of the following options may be carried out:
  Option 6: the UE may release or remove the received or stored CPA configuration, and perform a RRC re-establishment procedure.
  Option 7: the UE may perform a cell selection procedure based on a certain criteria. For example, the criteria may be a commonly used criteria, for example, the S-criteria; or any criteria that could be used to decide whether the cell is suitable for the UE to access to, for instance, the cell quality is higher than one threshold. The threshold can be configured by the network, e.g. the threshold is included in the RRC reconfiguration message sent in step 604, or the threshold is fixed in the 3GPP specification. If the selected cell belongs to a cell group including: the candidate PSCells of the selected PCell, the other candidate PCells except the selected PCell, the candidate PSCells of the other candidate PCells. For example, in FIG. 6a or FIG. 6b, the cell group includes: PCell 2, candidate PSCells belonging to C-SN1-1, . . . , C-SN1-x, C-SN2-1, . . . , and C-SN2-y. Then the UE performs a RACH procedure towards the selected cell; if RACH is successful, then the UE can keep data transmission with the selected cell, and consider this selected cell as the new PCell. If the RACH procedure towards the selected cell fails, the UE may initiate a RRC re-establishment procedure. If the selected cell does not belong to the cell group, the UE performs RRC re-establishment procedure.
  Option 8: the UE may perform a cell selection procedure based on a certain criteria among the cell group including: the candidate PSCells of the selected PCell, the other candidate PCells except the selected PCell, the candidate PSCells of the other candidate PCells. For example, in FIG. 6a, the cell group includes: PCell 2, candidate PSCells belonging to C-SN1-1, . . . , C-SN1-x, C-SN2-1, . . . , and C-SN2-y. If no cell belonging to the cell group fulfils the criteria, the UE may start the RRC re-establishment procedure.

FIG. 6b illustrates another flow chart of handling the CPA configuration in a conditional handover procedure in accordance with some embodiments of the present disclosure.

In FIG. 6b, steps 601-604 are similar to the steps in FIG. 6a, and the details are omitted here.

In step 609, upon receiving the RRC reconfiguration message from the source node, the UE evaluates CHO execution condition for each candidate PCell, when one CHO execution condition is satisfied, the UE considers this candidate PCell as the target PCell, and perform handover to this target PCell. During the handover procedure, the UE also evaluates the candidate PSCells of the target PCell according to the corresponding CPA execution condition.

Once a CPA execution condition of a specific candidate PSCell is satisfied, the UE can perform a PSCell addition procedure to add the specific candidate PSCell as the target PSCell for the UE. The PSCell addition procedure includes synchronization with the target PSCell.

In some embodiments, the result of step 609 may include at least the following cases:

Case 1: the CPA execution condition of one candidate PSCell is met, and the HO procedure successes;

Case 2: the CPA execution condition of one candidate PSCell is met, and after the UE access to the target PSCell successfully, the HO procedure fails, or a RLF occurs in the target PCell;

Case 3: none of the CPA execution conditions of the candidate PSCells is fulfilled, and the HO procedure successes; and Case 4: none of the CPA execution conditions of the candidate PSCells is fulfilled, and after the UE access to the target PSCell successfully, the HO procedure fails, or a RLF occurs in the target PCell.

Case 1: the CPA execution condition of one candidate PSCell is met, and the HO procedure successes. Under this scenario, at step 610, the UE performs synchronization and triggers the RACH procedure to the target PSCell in order to perform a PSCell addition procedure. The RACH procedure, to the target PSCell is also successful, and the UE is served by the target PCell and the target PSCell.

Case 2: the CPA execution condition of one candidate PSCell is met, and the HO procedure fails. In this case, at step 610, the UE performs synchronization and triggers the RACH procedure to the target PSCell in order to perform a PSCell addition procedure. In step 611, after the UE access to the target PSCell successfully, the HO procedure (i.e. the RACH procedure) to the target PCell fails, or a RLF occurs in the target PCell, then in step 612, the UE may consider the target PSCell as new PCell, i.e. C-SN1-1 is considered as the new MN, and continue the data transmission with C-SN1-1 without triggering the RRC re-establishment procedure. The UE may report a RLF report including the parameters such as: the source PCell ID, the target PCell ID, the failure cause, which may be handover failure or RLF, or other cause, time elapsed since receiving RRC reconfiguration message to failure, time elapsed since failure, or the like, to the new MN.

Case 3: none of the CPA execution condition of one candidate PSCell is fulfilled, and the HO procedure successes. Under this condition, the UE may release or remove the received or the stored CPA configuration when RLF occurs in the target PCell.

Case 4: none of the CPA execution conditions of the candidate PSCells is fulfilled, and after the UE access to the target PSCell successfully, the HO procedure fails or a RLF occurs in the target PCell. In this scenario, in addition to the above Option 6, Option 7, and Option 8, the UE may perform:

Option 9: the UE may continue to evaluate CPA execution condition for a predefined period, such as 10 ms, 100 ms, etc. The predefined period may be defined in the specification, or by the source node, or the UE. Or, the UE may continue to evaluate CPA execution condition until a timer expires, a period of the timer may be configured to the UE via the RRC reconfiguration message sent in step 604. During this period or while the timer is running, if the UE find a predefined condition of a specific candidate PSCell is satisfied, and the UE has successfully accessed to this specific PSCell, the UE may consider this specific PSCell as the new PCell, and keep data transmission with the new PSCell. If UE still fails to find a candidate PSCell, or the accessing to this specific candidate PSCell fails, the UE may perform at least one of the above Option 6, Option 7 and Option 8.

There is a special scenario, that is, the UE finds that a predefined condition of a specific candidate PSCell is satisfied, and the UE is accessing to this specific PSCell. During the accessing period, HOF happens or RLF in the target PCell occurs. The UE may perform at least one of the above options, i.e. Option 6, Option 7, or Option 8. The UE may also perform:

Option 10: the UE may continue to access to this specific PSCell for a predefined period, such as 10 ms, 100 ms, etc. The predefined period may be defined in the specification, or by the source node, or the UE. Or, the UE may continue to access to this specific PSCell until a timer expires, a period of the timer may be configured to the UE via the RRC reconfiguration message sent in step 604. If the accessing to this specific PSCell is successful, the UE may consider this specific PSCell as the new target PCell, and keep data transmission with the new target PCell. If the accessing to this specific candidate PSCell fails, the UE may perform at least one of the above Option 6, Option 7, and Option 8.

In still another preferred embodiment, when one CHO execution condition is satisfied, that is, the UE determines the target PCell, and one CPA execution condition of a PSCell of the target PCell is also satisfied, i.e., the UE determines the target PSCell, at this moment, the UE perform both the handover procedure and the PSCell addition procedure simultaneously.

The present solution focuses on the behaviors of the UE when the HO procedure fails or RLF in the target cell occurs after the UE has accessed to the target PSCell successfully or the UE is accessing the target PSCell. Under this condition, there are the following cases:

Case 1: the UE access to the target PSCell successfully. The UE may consider the target PSCell as the new PCell, e.g. C-SN1-1 in FIG. 6*b*, as the new MN, and continue the data transmission with C-SN1-1 without triggering the RRC re-establishment procedure. The UE may report a RLF report including the parameters such as: the source PCell ID, the target PCell ID, the failure cause, which may be handover failure or RLF, or other cause, time elapsed since receiving RRC reconfiguration message to failure, time elapsed since failure, or the like, to the C-SN1-1.

Case 2: the UE is accessing the target PSCell. During the accessing period, HOF happens or RLF in the target PCell occurs, in this case, the UE may perform at least one of the above Option 6, Option 7, Option 8, or Option 10. For example, if the UE performs Option 10, i.e. the UE continue to access to the target PSCell for a predefined period or until a timer expires. If the accessing to the target PSCell still fails, then the UE may perform at least one of the above Option 6, Option 7 or Option 8.

Figure 7:
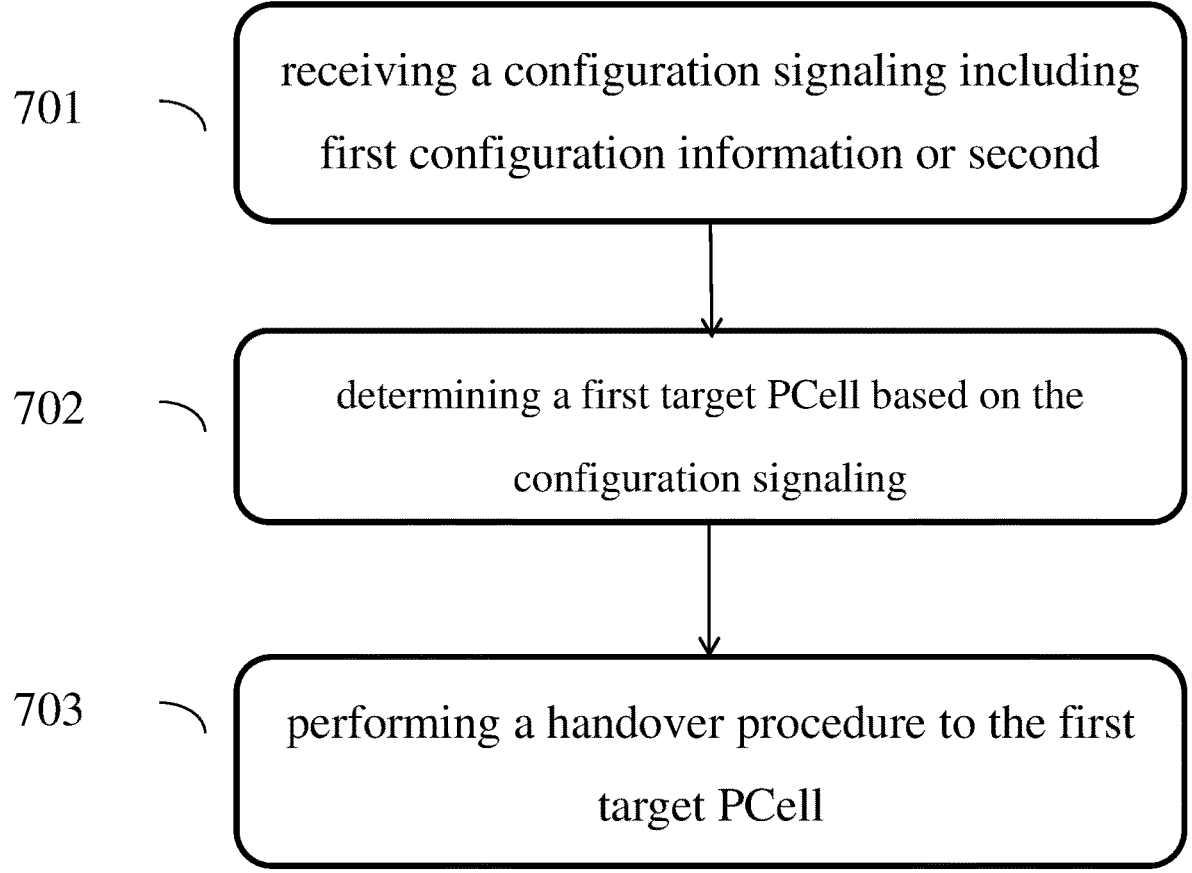
FIG. 7 illustrates a method performed by a UE for wireless communication according to a preferred embodiment of the present disclosure.

FIG. 7 illustrates a method performed by a UE for wireless communication according to a preferred embodiment of the present disclosure.

In step 701, the UE receiving a configuration signaling including first configuration information or second configuration information. The first configuration information or second configuration information may be sent via the RRC signaling. For example, the RRC signaling transmitted by the source node to the UE in step 504 in FIG. 5*a*. In step 702, the UE determining a first target PCell based on the configuration signaling, and in step 703, the UE performs a handover procedure to the first target PCell.

In the HO procedure, the configuration information is the first configuration information, which includes information of a first target PCell, information of a set of candidate PSCells, and each of the set of candidate PSCells is associated with the first target PCell and is configured with a CPA execution condition. For example, in FIG. 5a, the first configuration information includes the information of the target PCell, the information of the candidate PSCells, and the CPA execution condition for each candidate PSCell.

In the CHO procedure, the configuration information is the second configuration information, which includes information of one or more candidate PCells, each candidate PCell is associated with a CHO execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition. For example, in FIG. 6a, the second configuration information includes information of the candidate PCells belonging to C-target1 and C-target2, the CHO condition of the candidate PCells belonging to C-target1 and C-target2, the information of the candidate PSCells belonging to C-SN1-1, . . . , C-SN1-x, C-SN2-1, . . . , C-SN2-y, and the CPA execution condition of the candidate PSCells belonging to C-SN1-1, . . . , C-SN1-x, C-SN2-1, . . . , C-SN2-y.

In one case, the handover procedure to the first target PCell is successful, the UE then evaluates the CPA execution condition of each of a set of candidate PSCells associated with the first target PCell.

In another case, the handover procedure to the first target PCell is unsuccessful, the UE may perform a cell selection procedure based on a predefined criteria to select a cell as a second target PCell among a cell group at least including: a set of candidate PSCells associated with the first target PCell, the one or more candidate PCells, and each corresponding set of candidate PSCells associated with the one or more candidate PCells. For example, in FIG. 6a, the cell group may include: the cell group includes: a set of candidate PSCells associated with the first target PCell, which includes: the candidate PSCell(s) belonging to C-SN1-1, . . . , the candidate PSCell(s) belonging to C-SN1-x, the other candidate PCell, which includes: PCell 2, and the set of candidate PSCells associated with PCell 2, which includes: the candidate PSCell(s) belonging to C-SN2-1, . . . , the candidate PSCell(s) belonging to C-SN2-y.

After the cell selection procedure, the UE performs a RACH procedure to the second target PCell if the second target PCell belongs to the cell group; otherwise, the UE performs a RRC re-establishment procedure to the second target PCell if the second target PCell does not belong to the cell group.

In one embodiment, the UE may evaluate the CPA execution condition of each of a set of candidate PSCells associated with the first target PCell during the handover procedure to the first target PCell. For instance, in step 509 in FIG. 5b, the UE evaluate the CPA execution condition of the candidate PSCell(s) belonging to C-SN1 and the CPA execution condition of the candidate the PSCell(s) belonging to C-SNx, at the same time, the UE performs handover to the target PCell. After determining that the candidate PSCell associated with the first target PCell, e.g. a candidate PSCell belonging to C-SN1, has a CPA execution condition being met, the UE determines that the candidate PSCell belonging to C-SN1 is the target PSCell, and performs a RACH procedure to the target PSCell. If the handover procedure to the first target PCell is unsuccessful or a RLF occurs in the first target PCell, the UE may perform data transmission with the target PSCell, or continue access to the target PSCell, without triggering a RRC re-establishment procedure.

In another embodiment, if after evaluating the CPA execution condition, the UE found that none of the CPA execution conditions of each of a set of candidate PSCells associated with the first target PCell is met, i.e. no PSCells of the first target PCell is suitable, the UE may continue to evaluate the CPA execution condition of each of a set of candidate PSCells associated with the first target PCell for a predefined period or until a timer expires. Alternatively, the UE may performing a cell selection procedure based on a predefined criteria to select cell as a second target PCell among a cell group at least including: a set of candidate PSCells associated with the first target PCell, the one or more candidate PCells, and each corresponding set of candidate PSCells associated with the one or more candidate PCells. For example, in FIG. 6a, the cell group may include: a set of candidate PSCells associated with the first target PCell, which includes: candidate PSCells belonging to C-SN1-1, . . . , C-SN1-x, the other candidate PCell which includes: PCell 2, and a set of candidate PSCells associated with PCell 2, which includes: candidate PSCells belonging to C-SN2-1, . . . , C-SN2-y.

After the cell selection procedure, the UE performs a RACH procedure to the second target PCell, if the second target PCell belongs to the cell group; otherwise, the UE performs a RRC re-establishment procedure to the second target PCell if the second target PCell does not belong to the cell group.

In one embodiment, the UE may determine a candidate PCell whose associated CHO execution condition being met as the first target PCell, and determine the determining a candidate PSCell in a set of candidate PSCells associated with the first target PCell whose associated CPA execution condition being met as the target PSCell, then the UE performs the HO to the first target PCell and a RACH procedure to the target PSCell simultaneously.

In one scenario, the HO procedure to the first target PCell is unsuccessful or a radio link failure occurs in the first target PCell, and the RACH procedure to the target PSCell is successful, the UE may consider the target PSCell as the second target PCell, and perform data transmission with the target PSCell without triggering a RRC re-establishment procedure.

In another scenario, the HO procedure to the first target PCell is unsuccessful or a radio link failure occurs in the first target PCell, and the RACH procedure to the target PSCell is still ongoing, the UE may continue to access to the target PSCell for a period of time or after a timer expires. If the UE still fails to access to the target PSCell, the UE may perform a cell selection procedure.

Alternatively, the UE may choose not to continue to access to the target PSCell, and directly perform a cell selection procedure. The cell selection procedure may be based on a predefined criteria to select a cell as a second target PCell among a cell group. The cell group at least includes: a set of candidate PSCells associated with the first target PCell, the one or more candidate PCells, and each corresponding set of candidate PSCells associated with the one or more candidate PCells. For example, in FIG. 6a, the cell group may include: PCell 2, candidate PSCells belonging to C-SN1-1, . . . , C-SN1-x, C-SN2-1, . . . , and C-SN2-y.

Figure 8:
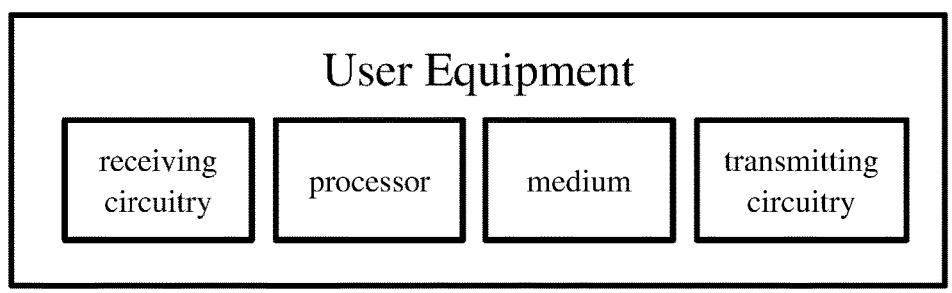
FIG. 8 illustrates a block diagram of a UE according to the embodiments of the present disclosure.

FIG. 8 illustrates a block diagram of a UE according to the embodiments of the present disclosure. The UE may include a receiving circuitry, a processor, and a transmitting circuitry. In one embodiment, the UE may include a non-transitory computer-readable medium having stored thereon computer-executable instructions; a receiving circuitry; a transmitting circuitry; and a processor coupled to the non-transitory computer-readable medium, the receiving circuitry and the transmitting circuitry. The computer executable instructions can be programmed to implement a method (e.g. the method in FIG. 5a) with the receiving circuitry, the transmitting circuitry and the processor.

The method of the present disclosure can be implemented on a programmed processor. However, controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device that has a finite state machine capable of implementing the flowcharts shown in the figures may be used to implement the processing functions of the present disclosure.

While the present disclosure has been described with specific embodiments thereof, it is evident that many alternatives, modifications, and variations will be apparent to those skilled in the art. For example, various components of the embodiments may be interchanged, added, or substituted in other embodiments. Also, all of the elements shown in each figure are not necessary for operation of the disclosed embodiments. For example, one skilled in the art of the disclosed embodiments would be capable of making and using the teachings of the present disclosure by simply employing the elements of the independent claims. Accordingly, the embodiments of the present disclosure as set forth herein are intended to be illustrative, not limiting. Various changes may be made without departing from the spirit and scope of the present disclosure.

In this disclosure, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed:

1. A method performed by a user equipment (UE), the method comprising:
    receiving a configuration signaling including first configuration information or second configuration information;
    determining a first target primary cell (PCell) based on the configuration signaling; and
    performing a handover procedure to the first target PCell;
    wherein the first configuration information includes information of a first target PCell, information of a set of candidate primary secondary cells (PSCells), and each of the set of candidate PSCells is associated with the first target PCell and is configured with a conditional PSCell addition (CPA) execution condition; and
    wherein the second configuration information includes information of one or more candidate PCells, each candidate PCell is associated with a conditional handover (CHO) execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition.

2. The method of claim 1, wherein, if the handover procedure to the first target PCell is successful, the method further comprises:
    evaluating the CPA execution condition of each of a set of candidate PSCells associated with the first target PCell.

3. The method of claim 1, wherein, if the handover procedure to the first target PCell is unsuccessful, the method further comprises:
    performing a cell selection procedure based on a predefined criteria to select a cell as a second target PCell among a cell group at least including:
    a set of candidate PSCells associated with the first target PCell,
    the one or more candidate PCells except the first target PCell, and
    each corresponding set of candidate PSCells associated with the one or more candidate PCells.

4. The method of claim 3, further comprising:
    if the second target PCell is included in the cell group, performing a random access channel (RACH) procedure to the second target PCell; or
    if the second target PCell is not included in the cell group, performing a radio resource control (RRC) re-establishment procedure to the second target PCell.

5. The method of claim 1, further comprising:
    evaluating the CPA execution condition of each of a set of candidate PSCells associated with the first target PCell during the handover procedure to the first target PCell.

6. The method of claim 5, further comprising:
    determining a candidate PSCell associated with the first target PCell whose associated CPA execution condition being met as a target PSCell; and
    performing a RACH procedure to the target PSCell.

7. The method of claim 6, wherein, if the handover procedure to the first target PCell is unsuccessful or a radio link failure occurs in the first target PCell, the method further comprises:
    performing data transmission with the target PSCell or continuing access to the target PSCell without triggering a RRC re-establishment procedure.

8. The method of claim 5, wherein, if none of the CPA execution conditions of each of a set of candidate PSCells associated with the first target PCell is met, the method further comprises:
    continuing to evaluate the CPA execution condition of each of a set of candidate PSCells associated with the first target PCell for a predefined period or until a timer expires.

9. The method of claim 5, wherein, if none of the CPA execution conditions of each of a set of candidate PSCells associated with the first target PCell is met, the method further comprises:
performing a cell selection procedure based on a pre-defined criteria to select cell as a second target PCell among a cell group at least including:
a set of candidate PSCells associated with the first target PCell,
the one or more candidate PCells except the first target PCell, and
each corresponding set of candidate PSCells associated with the one or more candidate PCells.

10. The method of claim 9, further comprising:
performing a random access channel (RACH) procedure to the second target PCell, the second target PCell is included in the cell group; or
performing a radio resource control (RRC) re-establishment procedure to the second target PCell, the second target PCell is not included in the cell group.

11. The method of claim 1, wherein, if the configuration signaling includes the second configuration information, the method further comprises:
determining a candidate PCell whose associated CHO execution condition being met as the first target PCell;
determining a candidate PSCell in a set of candidate PSCells associated with the first target PCell whose associated CPA execution condition being met as the target PSCell; and
performing the handover procedure to the first target PCell and performing a RACH procedure to the target PSCell simultaneously.

12. The method of claim 11, wherein, if the handover procedure to the first target PCell is unsuccessful or a radio link failure occurs in the first target PCell, and the RACH procedure to the target PSCell is successful, the method further comprises:
performing data transmission with the target PSCell without triggering a RRC re-establishment procedure.

13. The method of claim 11, wherein, if the handover procedure to the first target PCell is unsuccessful and the RACH procedure to the target PSCell is ongoing, the method further comprises:
continuing to access to the target PSCell, or
performing a cell selection procedure based on a pre-defined criteria to select a cell as a second target PCell among a cell group at least including:
a set of candidate PSCells associated with the first target PCell,
the one or more candidate PCells except the first target PCell, and
each corresponding set of candidate PSCells associated with the one or more candidate PCells.

14. The method of claim 13, wherein, if the access to the target PSCell is unsuccessful, the method further comprises:
performing a cell selection procedure based on a pre-defined criteria to select a cell as a second target PCell among a cell group at least including:
a set of candidate PSCells associated with the first target PCell,
the one or more candidate PCells except the first target PCell, and
each corresponding set of candidate PSCells associated with the one or more candidate PCells.

15. The method of claim 1, wherein a source master node (MN) determines a CHO execution condition for the candidate PCell, and a candidate MN determines the CPA execution condition for the one or more candidate PSCells.

16. A user equipment (UE), comprising:
at least one memory; and
at least one processor coupled with the at least one memory and configured to cause the UE to:
receive a configuration signaling including first configuration information or second configuration information;
determine a first target primary cell (PCell) based on the configuration signaling; and
perform a handover procedure to the first target PCell;
wherein the first configuration information includes information of a first target PCell, information of a set of candidate primary secondary cells (PSCells), and each of the set of candidate PSCells is associated with the first target PCell and is configured with a conditional PSCell addition (CPA) execution condition; and
wherein the second configuration information includes information of one or more candidate PCells, each candidate PCell is associated with a conditional handover (CHO) execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition.

17. The UE of claim 16, wherein, if the handover procedure to the first target PCell is successful, the at least one processor is configured to cause the UE to:
evaluate the CPA execution condition of each of a set of candidate PSCells associated with the first target PCell.

18. The UE of claim 16, wherein, if the handover procedure to the first target PCell is unsuccessful, the at least one processor is configured to cause the UE to:
perform a cell selection procedure based on a predefined criteria to select a cell as a second target PCell among a cell group at least including:
a set of candidate PSCells associated with the first target PCell,
the one or more candidate PCells except the first target PCell, and
each corresponding set of candidate PSCells associated with the one or more candidate PCells.

19. A processor for wireless communication, comprising:
at least one controller coupled with at least one memory and configured to cause the processor to:
receive a configuration signaling including first configuration information or second configuration information;
determine a first target primary cell (PCell) based on the configuration signaling; and
perform a handover procedure to the first target PCell;
wherein the first configuration information includes information of a first target PCell, information of a set of candidate primary secondary cells (PSCells), and each of the set of candidate PSCells is associated with the first target PCell and is configured with a conditional PSCell addition (CPA) execution condition; and wherein the second configuration information includes information of one or more candidate PCells, each candidate PCell is associated with a conditional handover (CHO) execution condition, and a candidate PCell among the one or more candidate PCells whose associated CHO condition being met is determined as the first target PCell, and wherein the second configuration information further includes information of one or more sets of candidate PSCells, each candidate PCell is associated with a corresponding set of candidate PSCells, and each candidate PSCell of the one or more sets of candidate PSCells is configured with a CPA execution condition.

20. The processor of claim 19, wherein, if the handover procedure to the first target PCell is successful, the at least one controller is configured to cause the processor to:
evaluate the CPA execution condition of each of a set of candidate PSCells associated with the first target PCell.

* * * * *